United States Patent
Hurtta

(10) Patent No.: US 7,817,618 B2
(45) Date of Patent: Oct. 19, 2010

(54) METHOD, SYSTEM AND DEVICES FOR OPTIMIZING USE OF CONTEXTS/ ACCESS POINT NAMES

(75) Inventor: Tuija Hurtta, Espoo (FI)

(73) Assignee: Nokia Corporation, Espoo (FI)

( * ) Notice: Subject to any disclaimer, the term of this patent is extended or adjusted under 35 U.S.C. 154(b) by 614 days.

(21) Appl. No.: 11/440,089

(22) Filed: May 25, 2006

(65) Prior Publication Data

US 2007/0121644 A1 May 31, 2007

(30) Foreign Application Priority Data

Nov. 25, 2005 (EP) ................... 05025798

(51) Int. Cl.
*H04L 12/28* (2006.01)
*H04L 12/56* (2006.01)

(52) U.S. Cl. ............... 370/351; 370/328; 370/395.52; 370/397; 370/399

(58) Field of Classification Search .......... 370/328, 370/338, 310.2, 397, 399, 400, 395.52; 455/432.1–433
See application file for complete search history.

(56) References Cited

U.S. PATENT DOCUMENTS

| | | | | |
|---|---|---|---|---|
| 6,614,774 B1 * | 9/2003 | Wang | ......................... | 370/338 |
| 7,079,499 B1 * | 7/2006 | Akhtar et al. | ............... | 370/310 |
| 7,299,272 B2 * | 11/2007 | Karjanlahti | ................. | 709/220 |
| 2005/0114543 A1 * | 5/2005 | Popovich et al. | ............ | 709/238 |
| 2005/0128975 A1 * | 6/2005 | Kobayashi et al. | .......... | 370/328 |
| 2005/0152401 A1 * | 7/2005 | Wiljakka et al. | ............ | 370/474 |
| 2005/0210141 A1 * | 9/2005 | Oyama et al. | ............... | 709/228 |
| 2005/0266842 A1 * | 12/2005 | Nasielski et al. | ......... | 455/432.1 |
| 2006/0029014 A1 * | 2/2006 | Maturi | ....................... | 370/328 |
| 2006/0165027 A1 * | 7/2006 | Heden | ........................ | 370/328 |
| 2006/0168303 A1 * | 7/2006 | Oyama et al. | ............... | 709/231 |
| 2009/0141688 A1 * | 6/2009 | Leung et al. | ................ | 370/331 |

* cited by examiner

*Primary Examiner*—Simon D Nguyen
(74) *Attorney, Agent, or Firm*—Harrington & Smith

(57) ABSTRACT

The invention provides a method, system and devices for providing a connection of a terminal to at least two networks for providing services to the terminal. The terminal establishes only one logical connection to a support node of a network for communication between the terminal and the network. The logical connection is used for providing services to the terminal from the at least two networks. A network visited by the terminal provides visited services in addition to home services provided to the terminal from a home network of the terminal, the services being provided in parallel.

16 Claims, 5 Drawing Sheets

METHOD, SYSTEM AND DEVICES FOR OPTIMIZING USE OF CONTEXTS/ ACCESS POINT NAMES

BACKGROUND OF THE INVENTION 3.9G is at the moment standardized in 3GPP as System Architecture Evolution (SAE). One of the targets has been to simplify the use of contexts and Access Point Names, APNs, in the 3.9G system. An APN provides routing information e.g. for SGSNs, Serving GPRS Support Nodes, and GGSNs, Gateway GPRS Support Nodes providing access points to networks.

At the moment, the assumption is that a default IP context is created when the UE registers to the 3.9G network. In 2G/3G terms, this means merging attach and PDP context activation procedures. In 2G/3G, the UE specified APN when activating a PDP context, but in 3.9G, there may be no need for the UE to request APN at registration, but the network can determine the default APN. The UE and the network should, however, have the same understanding on the default APN. This may be achieved e.g. by configuring the default APN to the UE or by indicating the default APN from the network to the UE when selected (i.e. at registration). An IP address is allocated for the default IP context. Secondary IP contexts with the same IP address may be created on need basis.

There may be use cases, when the subscriber wants to use both visited and home services at the same time. One such use case is a roaming subscriber who wants to have Internet access through the visited network and in parallel use a service such as Multimedia Messaging, MMS, through the home network. If the 2G/3G solution is re-used in 3.9G, this requires two IP contexts with two APNs.

FIG. 1 shows a structure wherein two contexts are required with two APNs. A user terminal 1 such as a mobile user equipment has stored or assigned a Visited IP Address and a Home IP Address for the two APNs. The terminal 1 can communicate with a visited eGGSN 2 ("e" stands for "enhanced" or "evolved") using the APN of the visited eGGSN 2 for getting access to visited services 3 which may be provided through a network visited by the terminal 1. The terminal 1 can further communicate with another visited eGGSN 4 using the other APN for getting access to home services 3 which may be provided through a network visited by the terminal 1. The visited eGGSN 4 communicates with a home eGGSN 5 providing access to home services 6 which may be provided in a home network of the terminal 1. The nodes 2, 4 stores and use two IP contexts for the two IP addresses of the terminal 1.

SUMMARY OF THE INVENTION

The invention provides a system, method and devices as defined in the claims, or in the description or drawings.

The invention provides optimizing use of contexts/APNs in networks such as networks according to 3.9G. The usage of contexts such as PDP (or IP) contexts is simplified for terminal and network element developers. Further, the effectiveness and power saving are increased, because the load on computing resources otherwise needed for managing several APNs, PDP contexts and IP addresses, is reduced.

The invention teaches arrangement how to manage with only one context such as an IP or PDP context, especially when using visited and home services in parallel.

The invention advantageously allows a terminal such as a user equipment, UE, to have only one logical connection, that is a context such as an IP context, with the network and to use that context for all services.

The invention further proposes solutions to further optimize the use of IP contexts and APNs in 3.9G, especially when using visited and home services in parallel.

One context such as an IP context can be used to use both services available through the visited network (called "visited services" in this specification) and through the home network (called "home services" in this specification).

The APN (or another or equivalent component) of an IP context can for instance indicate e.g. "access to visited services", "access to home services" or "access to visited and home services". The last value or indication may also be achieved by two APNs for the IP context: APN1="access to visited services"+APN2="access to home services".

DESCRIPTION OF EMBODIMENTS OF THE INVENTION

Figure 1:
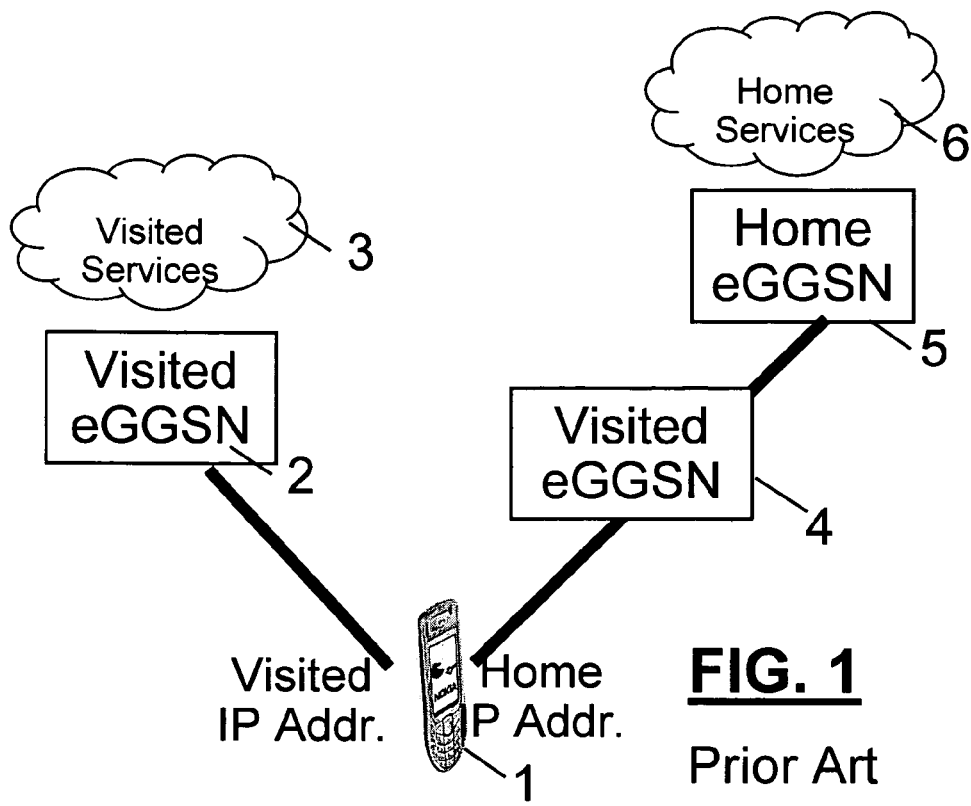
FIG. 1 shows a structure wherein two contexts are required with two APNs.
Figure 2:
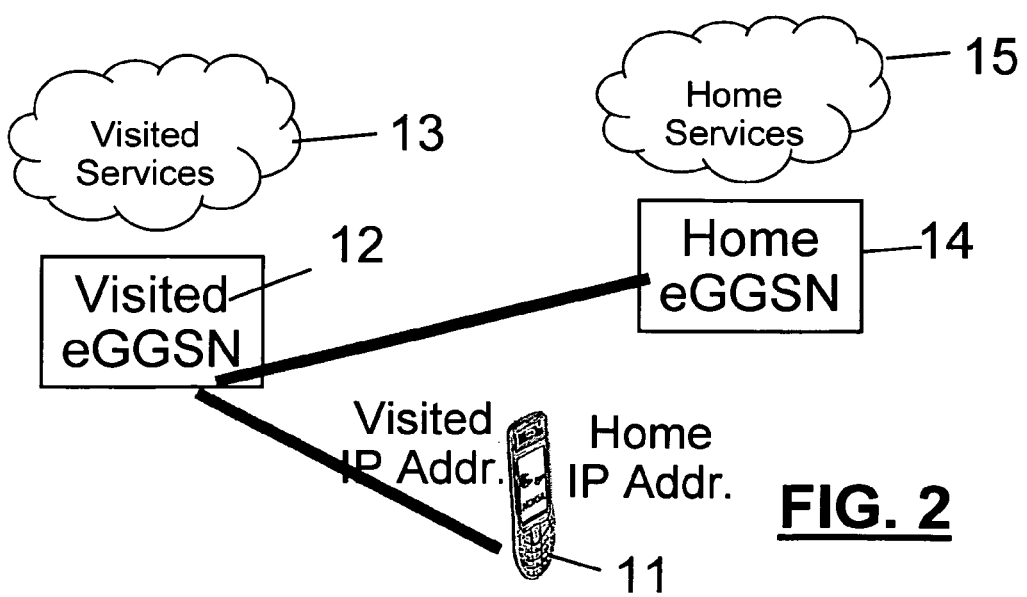
FIG. 2 shows an embodiment allowing parallel use of visited and home services using only one context.

FIG. 2 shows an embodiment of the invention wherein only one context is required. The context may include two IP addresses, that is the Visited IP Address and Home IP Address.

A user terminal 11 such as a mobile user equipment has a Visited IP Address and a Home IP Address. Both IP addresses may be provided in the same context. The terminal 11 has only one logical connection, that is only one context such as a protocol context e.g. IP context or PDP context to a visited eGGSN 12 for communicating therewith, e.g. for getting access to visited services 13 which may be provided through a network visited by the terminal 11. Services available through the visited network are called here "visited services" whereas services available through the home network are called "home services". The terminal 11 can further communicate with another eGGSN, home eGGSN, 14 via the visited eGGSN 12, for getting access to home services 15 which may be provided in the home network of the terminal 11. The visited eGGSN 12 has a connection with the home eGGSN 14 for getting access to home services 15. The eGGSN 12 or 14, and/or the terminal 11, stores and uses only one context for one or more IP addresses.

The visited eGGSN 12 knows or checks which uplink packets are meant for visited services 13 and which for home services 15. Context modification may be provided e.g. if UE 11 starts with visited services 13 and starts using home services 15 later on.

FIGS. 2 to 6 describe and show different optimization alternatives. These alternatives are quite similar, and the main difference is how IP addresses are allocated for the IP context. It is possible to either activate two IP addresses for the IP context (Home IP Address and Visited IP Address) or only one IP address (Home IP Address or Visited IP Address).

FIGS. 2 to 6 also describe and show what has to be done in a use case, when the subscriber e.g. starts either with "access to visited services" or "access to home services" and later on wants to use visited and home services in parallel. This use case requires APN modification for an active IP context. And possibly allocation of a new IP address for the IP context.

When one IP context is used to access both visited services and home services, the Evolved GGSN of the visited network has to know or decide, e.g. by checking the packets, which uplink packets are to be forwarded towards the visited services and which towards the home services (via the Evolved GGSN of the home network). To achieve this, different solutions may be used, e.g. 1) forwarding packets with Visited IP Address towards the visited services and packets with Home IP Address towards the home services, or 2) using filters for packet classification to determine which uplink packets are to be forwarded towards the visited services and which towards the home services, etc. In 2), filters of the visited services can be configured to the Evolved GGSN 12 of the visited network but filters of the home services have to be received from the home network (e.g. when receiving the subscription profile from the home network or when activating the IP context in the Evolved GGSN 14 of the home network).

Figure 3:
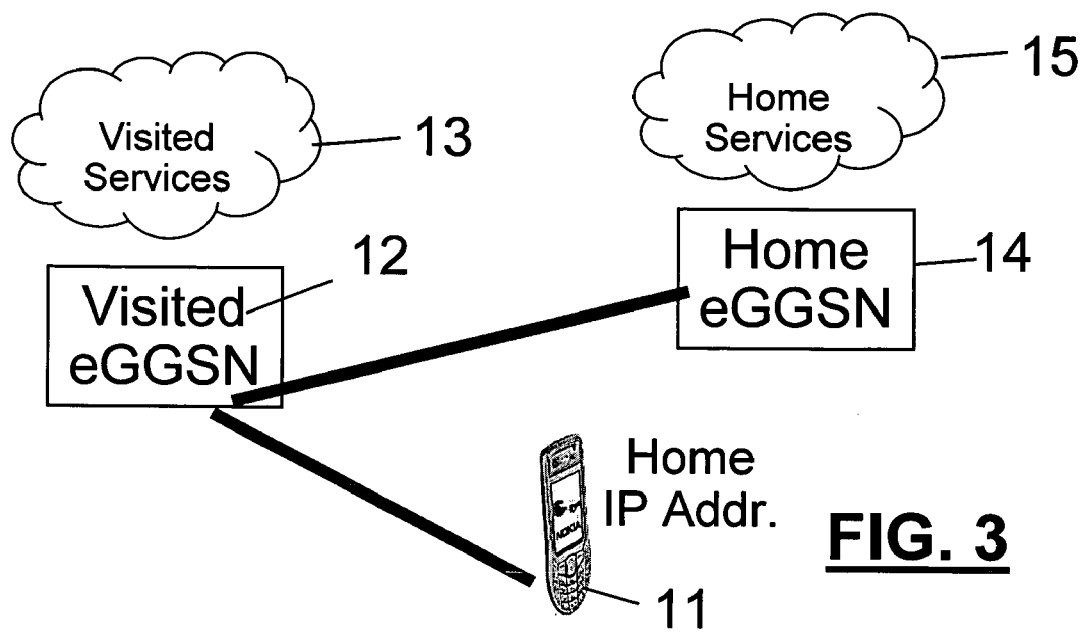
FIG. 3 shows a further embodiment allowing parallel use of visited and home services using only one context.
Figure 4:
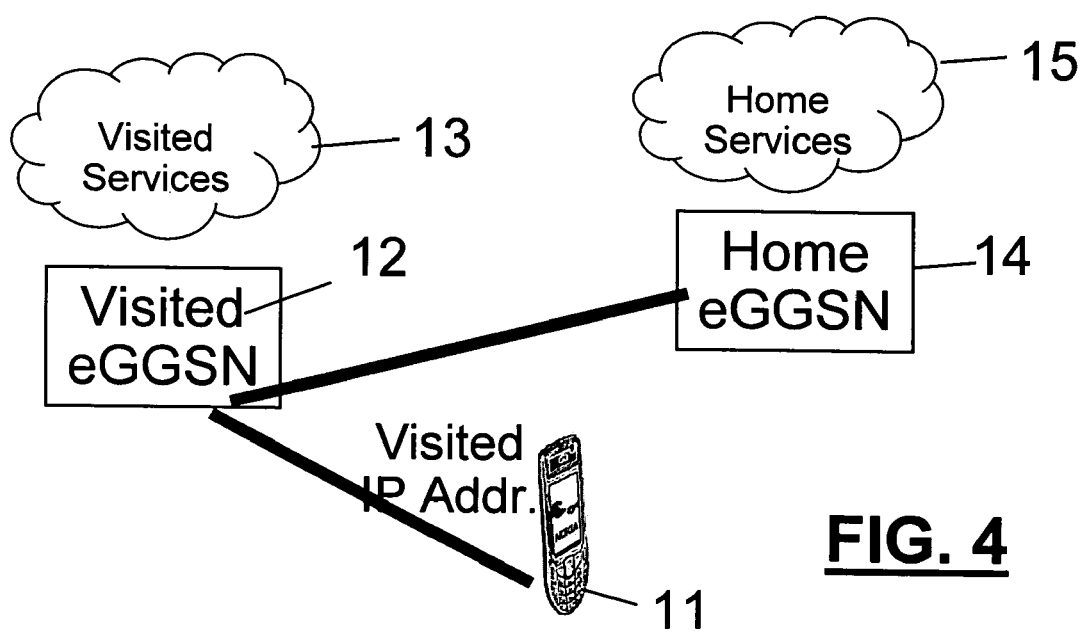
FIG. 4 shows another embodiment allowing parallel use of visited and home services using only one context.

In FIGS. 3 and 4, the same reference numerals as in FIG. 2 are used for designating the same elements/devices/components/functions.

In the embodiments of FIGS. 3, 4, one context with one IP address is provided. In FIG. 3, this IP address is the Home IP address. In FIG. 4, the IP address in or allocated to the context is the Visited IP address. In the embodiments of FIGS. 3, 4, the visited eGGSN 12 knows which uplink packets are meant for visited services 13 and which for home services 15, e.g. by using the mechanisms described above with regard to FIG. 2. Context modification is carried out e.g. if UE starts with visited services and starts using home services later on.

Figure 5:
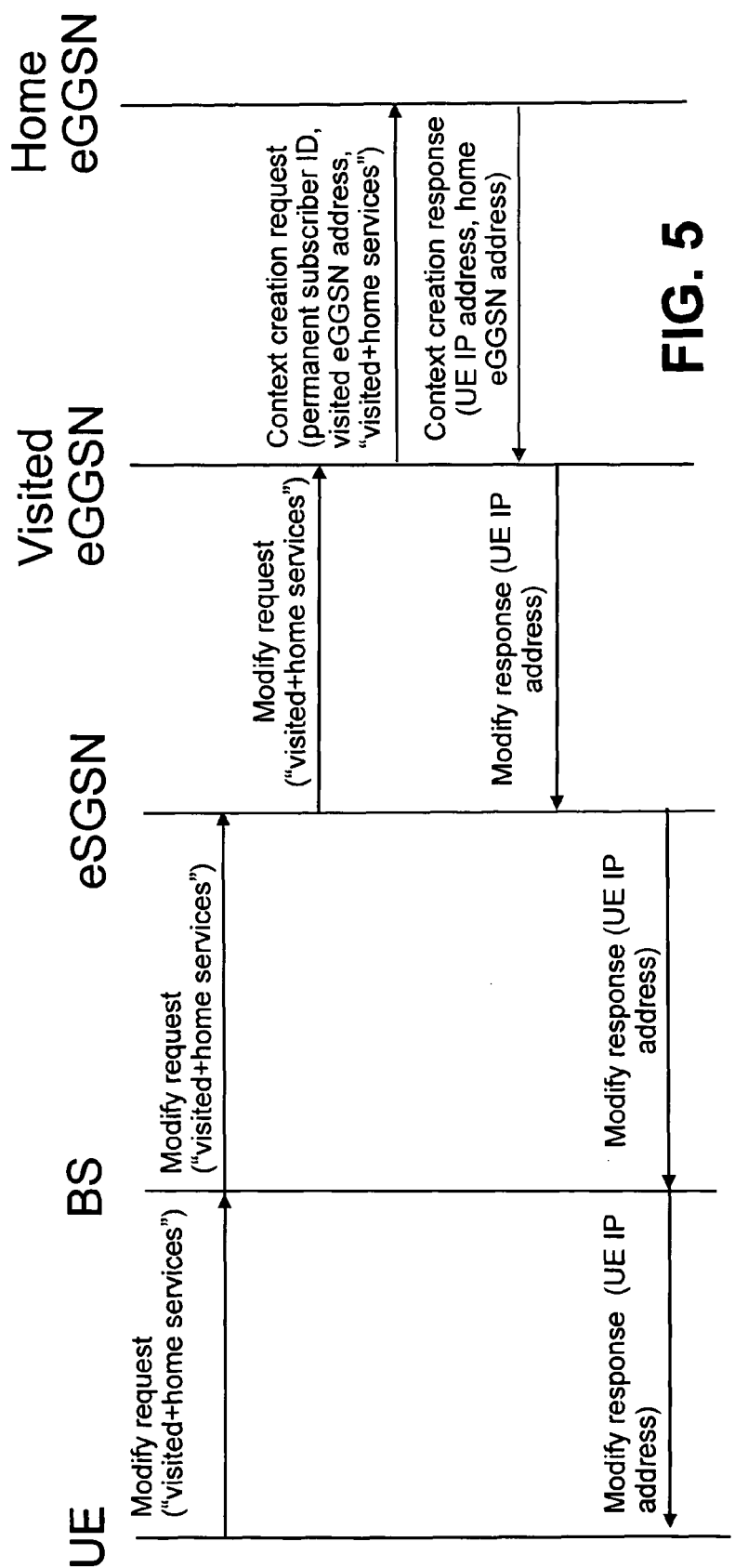
FIG. 5 illustrates a signaling flow of an embodiment of the invention wherein a Default IP context for "visited services" is used as a starting point.
Figure 5A:

FIG. 5 shows an embodiment of a structure and method in accordance with the invention. FIG. 5 illustrates a signaling flow for a case where the starting point is a Default IP context for "visited services". In this case, the APN of the Default IP context is modified (from "visited services" to "visited+home services"). FIG. 5A shows, for the case of FIG. 5, that a UE, e.g. the terminal 11, is connected to the visited eGGSN 12. According to FIG. 5, the UE sends a Modify request ("visited+home services") indicating that both visited and home services are requested, via a base station BS and an eSGSN, Enhanced Serving GPRS Support Node, to the visited eGGSN 12. The visited eGGSN 12 sends a Context creation request to the Home eGGSN 14. The Context creation request includes e.g. the information (permanent subscriber ID, visited eGGSN address, "visited+home services") so as to identify the terminal, UE, 11, the visited eGGSN address, and the requested visited+home services.

The Home eGGSN 14 creates an appropriate context and returns a Context creation response, indicating the UE IP address, and the home eGGSN address, to the visited eGGSN 12. In this case, the home eGGSN 14 is involved in the UE IP address allocation. The visited eGGSN 12 sends a Modify response, indicating the UE IP address, to the eSGSN which forwards the Modify response to the UE 11 via the base station BS.

Figure 6:
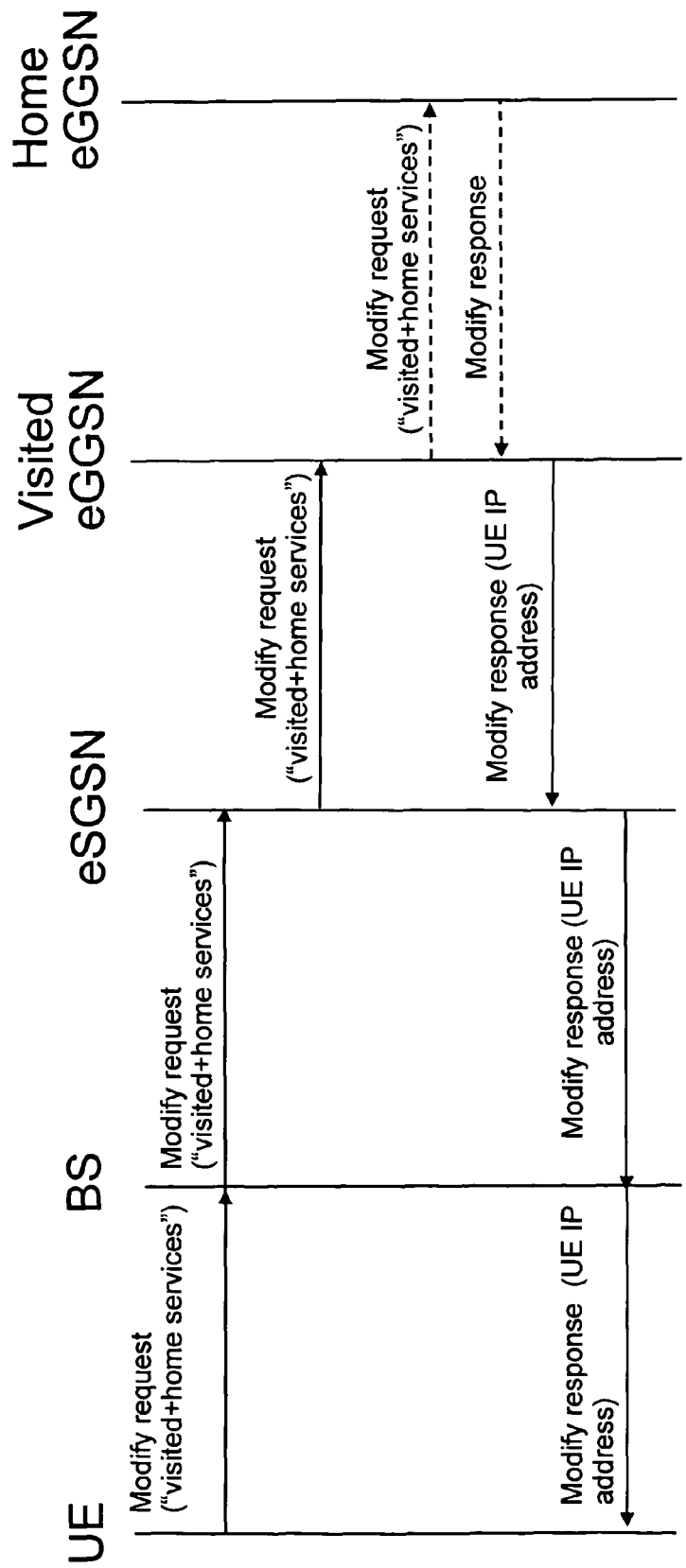
FIG. 6 shows a signaling flow of an embodiment of the invention wherein a Default IP context for "home services" is used as a starting point.
Figure 6A:

FIG. 6 shows another embodiment of a structure and method in accordance with the invention. FIG. 6 illustrates a signaling flow for a case where the starting point is a Default IP context for "home services". In this case, the APN of the Default IP context is modified (from "home services" to "visited+home services"). FIG. 6A shows, for the case of FIG. 6, that a UE, e.g. the terminal 11, is connected via the visited eGGSN 12, to the Home eGGSN 14. According to FIG. 6, the UE sends a Modify request ("visited+home services") indicating that both visited and home services are requested, via a base station BS, and an eSGSN, Enhanced Serving GPRS Support Node, to the visited eGGSN 12. The visited eGGSN 12 forwards the Modify request ("visited+home services") to the Home eGGSN 14 in which the default IP context has been created.

The Home eGGSN 14 modifies the context and returns a Modify response to the visited eGGSN 12. The visited eGGSN 12 sends a Modify response, indicating the UE IP address, to the visited eSGSN 12 which forwards the Modify response to the UE 11 via the eSGSN and the base station BS. In this case, the visited eGGSN is involved in the UE IP address allocation.

Figure 7:
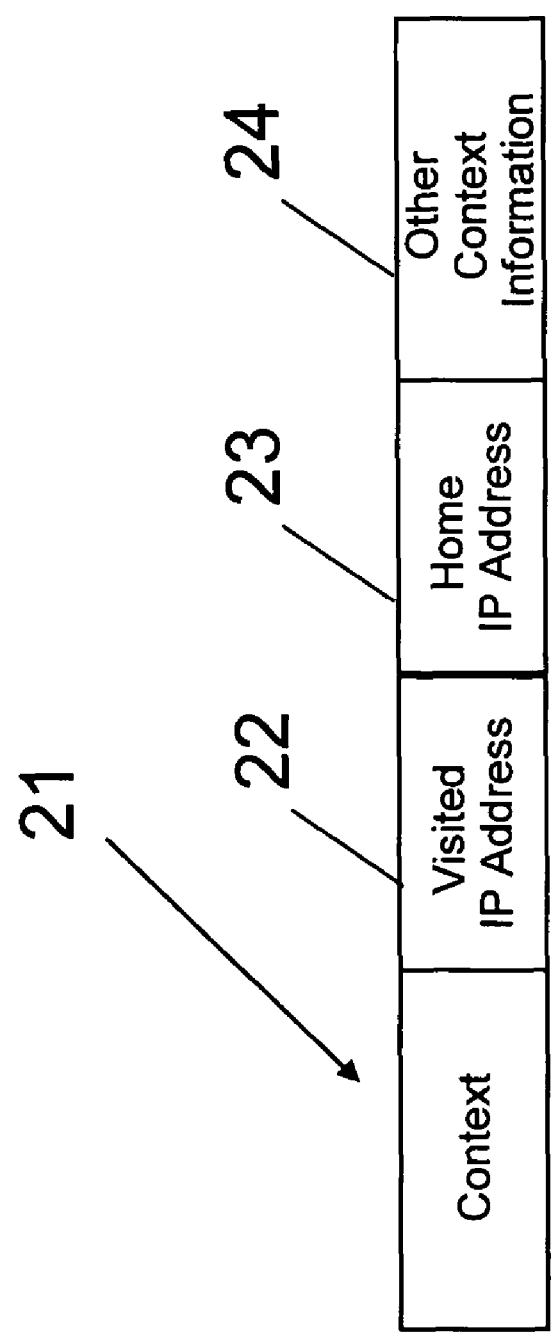
FIG. 7 shows an embodiment of a context.

FIG. 7 shows a basic structure of an embodiment of a context 21 which may be used with the present invention and may be an IP context, a PDP context, or a context of any other type such as a data context or protocol context. The context 21 includes at least one of a field 22 indicating a visited IP address, a field 23 indicating a Home IP address, and other fields 24 indicating other context information such as Quality of Service, QoS, parameters, charging parameters, or the like. The context 21 may be stored in at least one of the visited eGGSN 12, the home eGGSN 14, and the UE 11. Information related to the context may also be stored in the BS.

In the above embodiments, one context, e.g. one IP context, is activated for the UE 11 during registration to network. The UE 11 may have two IP addresses, a Visited IP address and a Home IP address, or may have only one IP address (a Visited IP address or a Home IP address). The visited eGGSN is involved in allocation of the Visited IP address, and the home eGGSN is involved in allocation of the Home IP address.

According to embodiments of the invention, one IP context is used for visited services and home services. The APN of the IP context is updated while the IP context is active. The IP address(es) are allocated for the context, e.g. IP context or PDP context.

The present invention is not restricted to the above embodiments but also covers all modifications, additions and deletions of the disclosed features.

The invention claimed is:

1. A method, comprising:
   establishing a logical connection between a terminal and a node of a first network to communicate between the terminal and the first network, the logical connection being used to provide services to the terminal from at least the first network and a second network,
   wherein first network services and second network services are provided in parallel in the logical connection,
   wherein the logical connection is a context and two internet protocol addresses, one for an internet protocol address of the first network and another for an internet protocol address of the second network, that are provided in the context, wherein when an uplink packet is received by the node in the first network, the node checks if the packet is for the first or the second network and, if the packet is for the second network, forwarding the packet to the second network.

2. The method according to claim 1, further comprising:
establishing, by the node, a connection to a node of the second network for providing a communication between the terminal and the second network.

3. The method according to claim 1, wherein the context is a protocol context.

4. The method according to claim 1, further comprising:
initiating, by the terminal or the node, a context modification or access point name modification when the terminal, after having started with using services of only one of the first and second networks, starts using services provided by an other of the first and second networks.

5. The method according to claim 1, wherein the two internet protocol addresses comprise either a visited internet protocol address and a home internet protocol address or only one internet protocol address for a visited network or for a home network of the terminal.

6. The method according to claim 1, wherein the first network is a visited network and the second network is a home network.

7. The method according to claim 1, further comprising using filters for packet classification to determine which uplink packets are to be forwarded towards the first network services and which uplink packets are to be forwarded towards the second network services.

8. The method according to claim 7, wherein the node is an enhanced serving general purpose radio service node.

9. An apparatus, comprising:
means for establishing a logical connection to a node of a first network for communication between a terminal and the first network, the logical connection being used for providing services to the terminal from at least the first network and a second network,
wherein first network services and second network services are provided in parallel in the logical connection,
wherein the logical connection is a context and two internet protocol addresses, one for an internet protocol address of the first network and another for an internet protocol address of the second network, are provided in the context, wherein when an uplink packet is received by the node in the first network, the node checks if the packet is for the first or the second network and, if the packet is for the second network, forwarding the packet to the second network.

10. An apparatus, comprising:
a connection unit configured to establish only one logical connection to a node of a first network for communication between a terminal and the first network, the logical connection being used for providing services to the terminal from at least the first network and a second network,
wherein first network services and second network services are provided in parallel in the logical connection,
wherein the logical connection is a context and two internet protocol addresses, one for an internet protocol address of the first network and another for an internet protocol address of the second network, are provided in the context, wherein when an uplink packet is received by the node in the first network, the node checks if the packet is for the first or the second network and, if the packet is for the second network, forwarding the packet to the second network.

11. The apparatus of claim 10, wherein the apparatus is configured to use the logical connection for sending a modify request to another node of another network for modifying the connection so as to provide services to the terminal from first and second networks.

12. The apparatus according to claim 10, wherein the node is an enhanced serving general purpose radio service node.

13. The method according to claim 4, further comprising:
assigning, by the terminal or the node, an interne protocol address, after having started with using services of the first and second networks, to the context.

14. A method, comprising:
establishing, by a processor, a logical connection between a terminal and a node of a home network to communicate between the terminal and the home network, the logical connection being used to provide services to the terminal from at least the home network and a visited network,
wherein home network services and visited network services are provided in parallel in the logical connection,
wherein the logical connection is a context and two internet protocol addresses, one for a visited internet protocol address and one for a home internet protocol address, are provided in the context, wherein when an uplink packet is received by the node in the first network, the node checks if the packet is for the home or the visited network and, if the packet is for the visited network, forwarding the packet to the second network.

15. The method according to claim 14, wherein the node is a visited enhanced serving general purpose radio service node.

16. The method according to claim 14, further comprising using filters for packet classification to determine which uplink packets are to be forwarded towards the visited services and which uplink packets are to be forwarded towards the home services.

* * * * *

UNITED STATES PATENT AND TRADEMARK OFFICE
CERTIFICATE OF CORRECTION

| | | |
|---|---|---|
| PATENT NO. | : 7,817,618 B2 | Page 1 of 1 |
| APPLICATION NO. | : 11/440089 | |
| DATED | : October 19, 2010 | |
| INVENTOR(S) | : Hurtta | |

It is certified that error appears in the above-identified patent and that said Letters Patent is hereby corrected as shown below:

Claim 13, col. 6, line 21 delete "interne" and insert --internet--.

Signed and Sealed this

Twenty-first Day of December, 2010

David J. Kappos
*Director of the United States Patent and Trademark Office*